US012068122B2

(12) United States Patent
Sato et al.

(10) Patent No.: US 12,068,122 B2
(45) Date of Patent: Aug. 20, 2024

(54) VACUUM VALVE AND METHOD FOR MANUFACTURING VACUUM CIRCUIT BREAKER

(71) Applicant: Mitsubishi Electric Corporation, Tokyo (JP)

(72) Inventors: Motohiro Sato, Tokyo (JP); Taiki Donen, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 173 days.

(21) Appl. No.: 17/780,747

(22) PCT Filed: Feb. 25, 2020

(86) PCT No.: PCT/JP2020/007443
§ 371 (c)(1),
(2) Date: May 27, 2022

(87) PCT Pub. No.: WO2021/171355
PCT Pub. Date: Sep. 2, 2021

(65) Prior Publication Data
US 2022/0415594 A1 Dec. 29, 2022

(51) Int. Cl.
*H01H 33/662* (2006.01)
*H01H 33/664* (2006.01)
*H01H 33/666* (2006.01)

(52) U.S. Cl.
CPC ...... *H01H 33/662* (2013.01); *H01H 33/6647* (2013.01); *H01H 33/6661* (2013.01); *H01H 2033/6667* (2013.01)

(58) Field of Classification Search
CPC ............. H01H 33/662; H01H 33/6647; H01H 33/6661; H01H 33/666; H01H 33/74;
(Continued)

(56) References Cited

U.S. PATENT DOCUMENTS 9,208,966 B2 * 12/2015 Sugiyama ................ H01H 1/64
9,208,978 B2 * 12/2015 Yano ........................ H01H 9/16
(Continued)

FOREIGN PATENT DOCUMENTS

JP H0330225 A 2/1991
JP H10340655 A 12/1998
(Continued)

OTHER PUBLICATIONS

International Search Report (PCT/ISA/210) with translation and Written Opinion (PCT/ISA/237) mailed on Apr. 14, 2020, by the Japan Patent Office as the International Searching Authority for International Application No. PCT/JP2020/007443. (9 pages).
(Continued)

*Primary Examiner* — William A Bolton
(74) *Attorney, Agent, or Firm* — BUCHANAN INGERSOLL & ROONEY PC

(57) ABSTRACT

A vacuum valve includes: a vacuum vessel; a cylinder; a partition wall separating an inside of the vacuum vessel from an inside of the cylinder; a movable conductor penetrating the partition wall being movable in an axial direction; a fixed contact fixed inside the vacuum vessel; a moving contact integrated with the movable conductor and being capable of separating from the fixed contact and coming into contact with the fixed contact in association with movement of the movable conductor; a lid that covers an end of the cylinder, the end being on a side opposite to the partition wall; a connecting rod penetrating the lid and coupled to the movable conductor via an insulating rod as an insulator; and a holder that holds the connecting rod while preventing movement of the connecting rod toward the fixed contact in a state where the moving contact is separated from the fixed contact.

2 Claims, 3 Drawing Sheets

(58) Field of Classification Search
CPC ... H01H 2033/6667; H01H 2033/6665; H01H 2033/66253; H01H 2033/66223; H01H 2033/6668; H01H 9/30
USPC ......... 218/134, 139, 42, 55, 79, 80, 97, 100, 218/118
See application file for complete search history.

(56) References Cited

U.S. PATENT DOCUMENTS

| | | | | |
|---|---|---|---|---|
| 9,214,306 | B2 | 12/2015 | Yoshida et al. | |
| 9,396,888 | B1 * | 7/2016 | Yeckley | H01F 27/04 |
| 9,806,504 | B2 * | 10/2017 | Yoshitomo | H02B 13/0358 |
| 9,893,515 | B2 * | 2/2018 | Arioka | H01H 33/161 |
| 9,997,312 | B2 * | 6/2018 | Ozil | H01H 33/565 |
| 2014/0374383 | A1 * | 12/2014 | Shioiri | H01H 33/66207 218/139 |
| 2015/0083691 | A1 * | 3/2015 | Matsui | H01H 33/6661 218/3 |
| 2015/0244158 | A1 * | 8/2015 | Fukuoka | H01B 17/26 218/139 |
| 2016/0225557 | A1 | 8/2016 | Kanaya et al. | |

FOREIGN PATENT DOCUMENTS

| | | | |
|---|---|---|---|
| JP | 2004281059 | A | 10/2004 |
| JP | 2015043656 | A | 3/2015 |
| WO | 2012063501 | A1 | 5/2012 |

OTHER PUBLICATIONS

Extended European Search Report issued in corresponding European Patent Application No. 20922170.4, mailed on Mar. 23, 2023, 7 pages.

* cited by examiner

VACUUM VALVE AND METHOD FOR MANUFACTURING VACUUM CIRCUIT BREAKER

FIELD

The present disclosure relates to a vacuum valve to be provided in a vacuum circuit breaker and a method of manufacturing the vacuum circuit breaker.

BACKGROUND

When a vacuum valve is manufactured which includes a vacuum vessel and elements to be provided inside the vacuum vessel, there are cases where voltage conditioning of the vacuum valve is performed after the elements included in the vacuum valve are combined and a vacuum is produced in the vacuum vessel. In voltage conditioning, application of a voltage between a fixed contact and a moving contact in the vacuum vessel causes dielectric breakdown originating from a micro-protrusion. Micro-protrusions may be present on the surfaces of the elements disposed inside the vacuum vessel. The dielectric breakdown is repeated, and micro-protrusions are evaporated due to heat generated by electric discharge, so that the micro-protrusions are removed. The voltage resistance performance of the vacuum valve is improved by removal of micro-protrusions that may cause a decrease in the insulating properties of the vacuum valve.

It is necessary to move the vacuum valve before the vacuum valve is installed in a vacuum circuit breaker after the vacuum valve is taken out from a voltage application apparatus that performs voltage conditioning. When the fixed contact and the moving contact are in contact with each other at the time of movement of the vacuum valve, the fixed contact and the moving contact may be rubbed against each other, causing a scratch on the fixed contact or the moving contact. When the fixed contact or the moving contact is scratched, the voltage resistance performance of the vacuum valve is deteriorated as in the above-described case where micro-protrusions are present.

Patent Literature 1 discloses a vacuum valve including a movable conductor integrated with a moving contact and having a mechanism for holding the movable conductor in a state where the moving contact is separated from a fixed contact. The mechanism disclosed in Patent Literature 1 includes a pin to be passed through a hole formed in the movable conductor. A part of the pin protrudes from the hole, and the protruding part comes into contact with the outer surface of a vacuum vessel. This suppresses the moving contact from coming into contact with the fixed contact. After the vacuum valve is installed in a vacuum circuit breaker, the pin is removed from the movable conductor. The vacuum valve of Patent Literature 1 holds the movable conductor in a state where the moving contact is separated from the fixed contact, and thus suppresses a situation where the fixed contact and the moving contact are rubbed against each other during movement.

CITATION LIST

Patent Literature

Patent Literature 1: Japanese Patent Application Laid-open No. 10-340655

SUMMARY

Technical Problem

According to the conventional technique related to Patent Literature 1, when a vacuum valve is installed in a vacuum circuit breaker, it is necessary to remove a pin before a movable conductor is coupled to a connecting rod that couples a manipulator to the movable conductor. Therefore, there may occur an axial misalignment between elements in a vacuum vessel. Therefore, installation of the vacuum valve in the vacuum circuit breaker may cause the relative positions of a fixed contact and a moving contact to change from the relative positions thereof observed when voltage conditioning was performed. The relative positions of the fixed contact and the moving contact having changed from the relative positions thereof observed when voltage conditioning was performed may cause deterioration of the voltage resistance performance of the vacuum valve. As described above, the conventional technique has a problem in that the voltage resistance performance of the vacuum valve may be deteriorated.

The present disclosure has been made in view of the above, and an object of the present disclosure is to obtain a vacuum valve capable of suppressing deterioration of voltage resistance performance.

Solution to Problem

To solve the above problems and achieve the object a vacuum valve according to the present disclosure includes: a cylindrical vacuum vessel; a cylinder disposed coaxially with the vacuum vessel; a partition wall provided between an end of the vacuum vessel and an end of the cylinder, the partition wall separating an inside of the vacuum vessel from an inside of the cylinder; a movable conductor penetrating the partition wall, the movable conductor being movable in an axial direction in the vacuum vessel and the cylinder; a fixed contact fixed inside the vacuum vessel; a moving contact integrated with the movable conductor, the moving contact being capable of separating from the fixed contact and coming into contact with the fixed contact in association with movement of the movable conductor; a lid adapted to cover an end of the cylinder, the end being on a side opposite to the partition wall; a connecting rod penetrating the lid and coupled to the movable conductor via an insulator; and a holder adapted to hold the connecting rod while preventing movement of the connecting rod toward the fixed contact in a state where the moving contact is separated from the fixed contact.

Advantageous Effects of Invention

A vacuum valve according to the present disclosure has the effect of suppressing deterioration of voltage resistance performance.

DESCRIPTION OF EMBODIMENTS

Hereinafter, a vacuum valve and a method for manufacturing a vacuum circuit breaker according to an embodiment will be described in detail with reference to the drawings.

Embodiment

Figure 1:
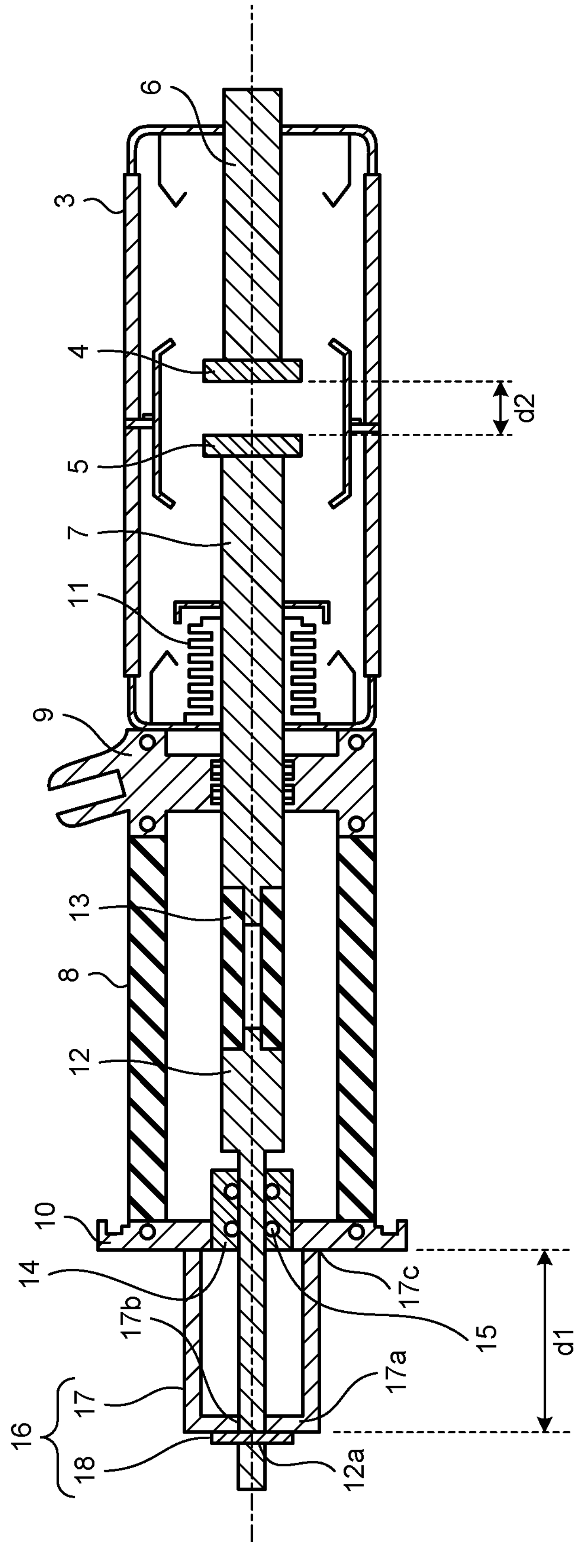
FIG. 1 is a cross-sectional view of a vacuum valve according to an embodiment.
Figure 2:
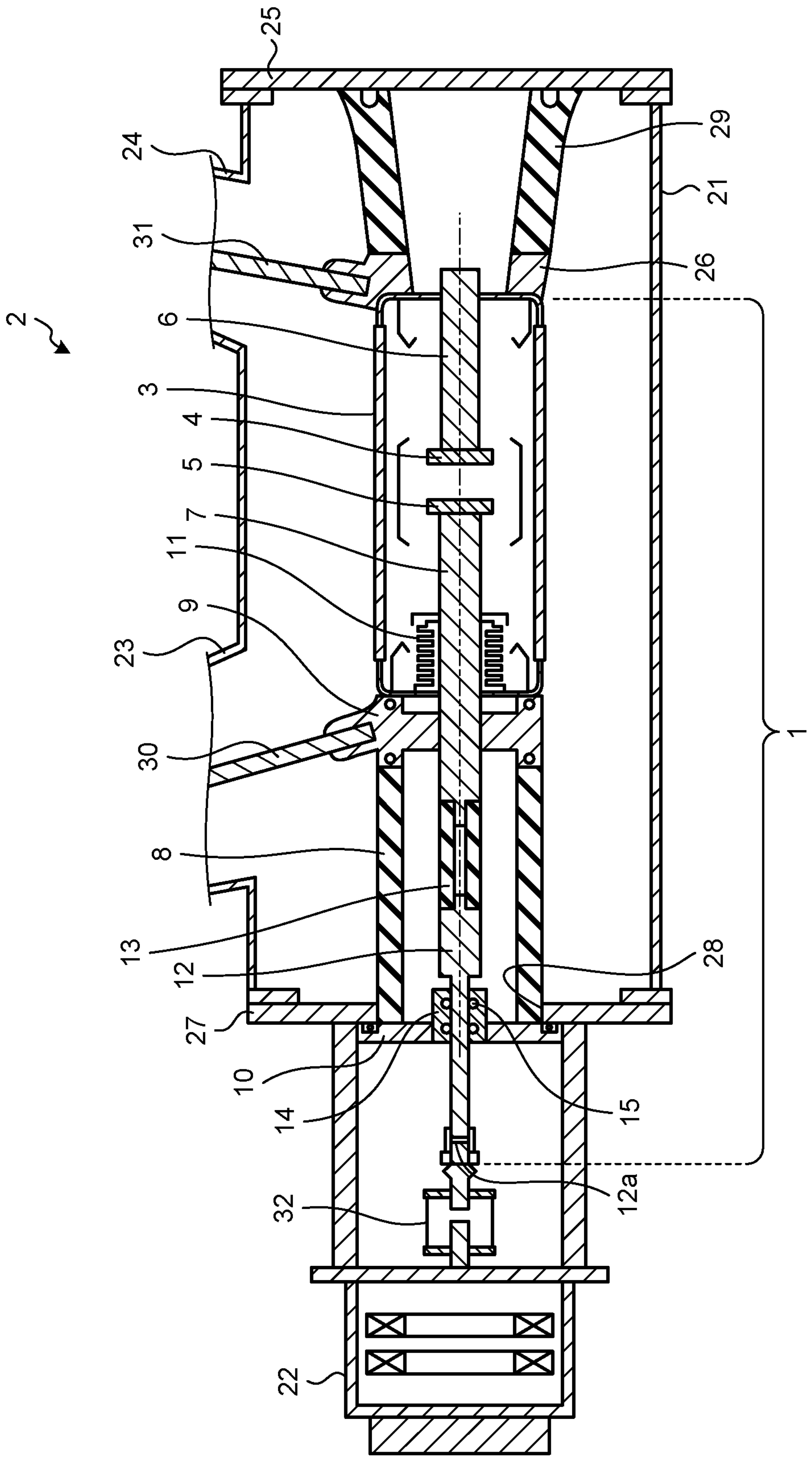
FIG. 2 is a cross-sectional view of a vacuum circuit breaker including the vacuum valve according to the embodiment.

FIG. 1 is a cross-sectional view of a vacuum valve according to an embodiment. FIG. 2 is a cross-sectional view of a vacuum circuit breaker including the vacuum valve according to the embodiment. A vacuum valve 1 is a structure in which a vacuum vessel 3 is integrated with some constituent elements of a vacuum circuit breaker 2. The vacuum valve 1 is installed in a voltage application apparatus that performs voltage conditioning of the vacuum vessel 3. The vacuum valve 1 is incorporated into the vacuum circuit breaker 2 after voltage conditioning of the vacuum valve 1 is performed. FIG. 1 illustrates the vacuum valve 1 yet to be incorporated into the vacuum circuit breaker 2.

The vacuum valve 1 includes: the vacuum vessel 3 being a cylinder; a fixed contact 4 fixed inside the vacuum vessel 3; a moving contact 5 movable in the vacuum vessel 3, a fixed conductor 6, and a movable conductor 7. The fixed contact 4 and the moving contact 5 are a pair of electrodes disposed inside the vacuum vessel 3 in which a high vacuum is produced. The vacuum circuit breaker 2 opens an electric circuit by separating the moving contact 5 from the fixed contact 4, and closes the electric circuit by bringing the moving contact 5 into contact with the fixed contact 4. The fixed contact 4 is provided at an end of the fixed conductor 6, and is integrated with the fixed conductor 6. The moving contact 5 is provided at an end of the movable conductor 7, and is integrated with the movable conductor 7.

The vacuum valve 1 includes: a cylinder 8 made of insulating material; and a partition wall 9 made of metal material. The cylinder 8 is a cylindrical hollow body. The cylinder 8 is coaxially arranged with the vacuum vessel 3. The partition wall 9 is provided between an end of the vacuum vessel 3 and an end of the cylinder 8. The partition wall 9 separates the inside of the vacuum vessel 3 from the inside of the cylinder 8. The vacuum valve 1 includes a lid 10 that covers an end of the cylinder 8, the end being on a side opposite to the partition wall 9. The cylinder 8, the partition wall 9, and the lid 10 form an enclosed space to be filled with an insulating gas. The lid 10 includes a flange.

The movable conductor 7 penetrates the partition wall 9, and is movable in an axial direction in the vacuum vessel 3 and the cylinder 8. The axial direction refers to the direction of the common central axis of the vacuum vessel 3 and the cylinder 8. The fixed conductor 6 penetrates an end of the vacuum vessel 3, the end being on a side opposite to the partition wall 9. A bellows 11 is provided at an inner end of the vacuum vessel 3, the inner end being on a side on which the partition wall 9 is located. The movable conductor 7 penetrates the inside of the bellows 11. The inside of the bellows 11 communicates with the inside of the cylinder 8. The bellows 11 expands and contracts, following the movement of the movable conductor 7. As a result of providing the bellows 11, the vacuum circuit breaker 2 can move the movable conductor 7 while maintaining vacuum in the vacuum vessel 3.

The vacuum valve 1 includes: a connecting rod 12 that penetrates the lid 10; and an insulating rod 13 that is an insulator. The insulating rod 13 insulates the movable conductor 7 and the connecting rod 12 from each other in the cylinder 8, and couples the movable conductor 7 to the connecting rod 12. The connecting rod 12 is coupled to the movable conductor 7 via the insulating rod 13.

A seal case 14 is provided in a part of the lid 10 through which the connecting rod 12 passes. The seal case 14 has a hole through which the connecting rod 12 passes. Grooves are formed in the wall surface of the hole. Sealers 15 such as an O-ring are fitted into the grooves. The connecting rod 12 moves in the axial direction while in contact with the sealers 15. As a result of providing the sealers 15, the vacuum circuit breaker 2 can move the connecting rod 12 while maintaining airtightness in the cylinder 8.

The vacuum valve 1 illustrated in FIG. 1 includes a holder 16. The holder 16 holds the connecting rod 12 while preventing the movement of the connecting rod 12 toward the fixed contact 4 in a state where the moving contact 5 is separated from the fixed contact 4. The holder 16 includes a retainer 17 and a pin 18 that is a fastener.

The retainer 17 is detachably attached to the lid 10, and holds a part of the connecting rod 12, the part protruding from the lid 10 to the outside of the cylinder 8. A hole **17*b* through which the connecting rod 12 passes is formed at an end 17*a* of the retainer 17, the end 17*a* being on a side opposite to the lid 10. The connecting rod 12 is passed through the hole 17*b*. As a result, the connecting rod 12 is held in a state where a part of the connecting rod 12 protrudes from the end 17*a*. The retainer 17 is attached to the lid 10 such that an end 17*c* of the retainer 17 is in contact with the lid 10. The end 17*c* is on a side on which the lid 10** is located.

A hole **12*a* piercing the connecting rod 12 is formed in a part of the connecting rod 12, the part protruding from the end 17*a*. The pin 18 is inserted into the hole 12*a* to be attached to the connecting rod 12. A part of the pin 18 protrudes from the hole 12*a*, and comes into contact with the end 17*a*. This allows the holder 16 to prevent the movement of the connecting rod 12 toward the fixed contact 4. Note that the holder 16 is removed after the vacuum valve 1 is incorporated into the vacuum circuit breaker 2. FIG. 2 illustrates the vacuum circuit breaker 2 from which the holder 16** has been removed.

The hole **12*a* to be formed in the connecting rod 12 is not limited to one piercing the connecting rod 12, and may be one not piercing the connecting rod 12. The fastener is not limited to the pin 18 as long as the fastener can be attached through the hole 12*a* piercing the connecting rod 12 or the hole 12*a* not piercing the connecting rod 12**. The fastener may be a partially cut ring or the like.

The vacuum circuit breaker 2 includes the vacuum valve 1, a tank 21, and a manipulator 22 that causes the connecting rod 12 to operate. Space outside the vacuum valve 1 in the tank 21 is filled with an insulating gas. The pressure of the insulating gas outside the vacuum valve 1 in the tank 21 is higher than the pressure of the insulating gas inside the cylinder 8. A branch pipe 23 and a branch pipe 24 are provided at an upper part of the tank 21.

One end of the tank 21 in the axial direction is covered with a lid 25. A lid 27 having an opening 28 is provided at an end of the tank 21, the end being on a side opposite to the lid 25. The vacuum valve 1 is passed through the opening 28 from outside the tank 21, and is disposed inside the tank 21. The flange of the lid 10 is fixed to the lid 27 from outside the tank 21.

A shield 26 is provided in the tank 21 such that the shield 26 is connected to the end of the vacuum vessel 3, the end being on the side opposite to the partition wall 9. An insulating support 29 is attached to a surface of the lid 25, the surface being on the inner side of the tank 21. The insulating support 29 supports the shield 26 in the tank 21 while insulating the shield 26 from the tank 21.

An outer conductor 30 disposed inside the branch pipe 23 is connected to the partition wall 9. The outer conductor 30 and the movable conductor 7 are electrically connected via the partition wall 9. An outer conductor 31 disposed inside the branch pipe 24 is connected to the shield 26. The outer conductor 31 and the fixed conductor 6 are electrically connected via the shield 26.

An end of the connecting rod 12, on a side opposite to the insulating rod 13 is coupled to a connector 32 of the manipulator 22. The manipulator 22 opens and closes the vacuum circuit breaker 2 by causing the connecting rod 12 to operate. The moving contact 5 separates from the fixed contact 4 and comes into contact with the fixed contact 4 in association with the movement of the connecting rod 12, the insulating rod 13, and the movable conductor 7.

Figure 3:
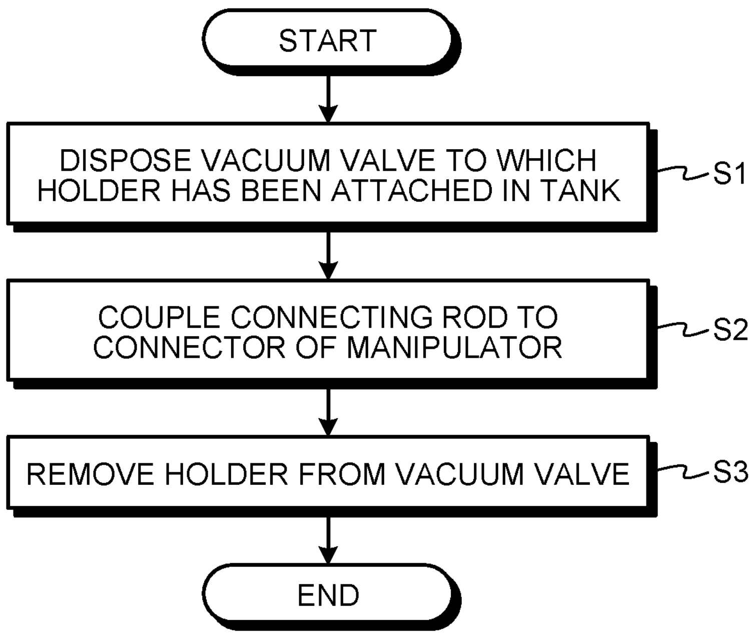
FIG. 3 is a flowchart illustrating a procedure for incorporating the vacuum valve according to the embodiment into the vacuum circuit breaker.

Next, a method for manufacturing the vacuum circuit breaker 2 will be described. Here, a description will be given of a procedure for incorporating the vacuum valve 1 into the vacuum circuit breaker 2. FIG. 3 is a flowchart illustrating a procedure for incorporating the vacuum valve according to the embodiment into the vacuum circuit breaker.

In step S1, the vacuum valve 1 to which the holder 16 has been attached is disposed inside the tank 21. The vacuum valve 1 is inserted into the tank 21, with the end of the vacuum vessel 3 passed through the opening 28 first, the end being on the side opposite to the partition wall 9. In step S2, the connecting rod 12 is coupled to the connector 32 of the manipulator 22. After the coupling of the connecting rod 12 to the connector 32 is completed, the holder 16 is removed from the vacuum valve 1 in step S3. As a result, the vacuum valve 1 is incorporated into the vacuum circuit breaker 2 in a state where the connecting rod 12 is connected to the manipulator 22.

Before the vacuum valve 1 is combined with constituent elements other than the vacuum valve 1 in the vacuum circuit breaker 2, the holder 16 holds the connecting rod 12 in a state where the moving contact 5 is separated from the fixed contact 4. In a state where the moving contact 5 is separated from the fixed contact 4, the holder 16 prevents the movement of the connecting rod 12 toward the fixed contact 4. As a result, the vacuum valve 1 suppresses the moving contact 5 from coming into contact with the fixed contact 4. This allows the vacuum valve 1 to suppress deterioration of voltage resistance performance due to a scratch on the fixed contact 4 or the moving contact 5.

Voltage conditioning of the vacuum valve 1 is performed in a state where elements of the vacuum valve 1 are combined in the same form as that in which the elements are combined in the vacuum valve 1 installed in the vacuum circuit breaker 2. When the voltage conditioning is completed, the vacuum valve 1 and the constituent elements of the vacuum circuit breaker 2 other than the vacuum valve 1 are put together while the form is maintained. The holder 16 is removed after the movable conductor 7 is coupled to the manipulator 22 via the connecting rod 12 and the insulating rod 13. As a result, an axial misalignment among the elements of the vacuum valve 1 is suppressed. The vacuum valve 1 can suppress the change of relative positions between the fixed contact 4 and the moving contact 5 from the relative positions thereof observed when voltage conditioning was performed. Thus, the vacuum valve 1 can suppress deterioration of voltage resistance performance. Note that the holder 16 is not limited to the combination of the retainer 17 and the fastener, and can be changed as appropriate. A component that couples the manipulator 22 to the connecting rod 12 may be used for the holder 16.

In FIG. 1, the symbol "d1" denotes the distance between the pin 18 and the end 17*c* of the retainer 17, the end 17*c* being on the side on which the lid 10 is located. The symbol "d2" denotes the distance between the fixed contact 4 and the moving contact 5 in a state where the pin 18 is in contact with the retainer 17, that is, the distance between the fixed contact 4 and the moving contact 5 in a state where the vacuum circuit breaker 2 opens the electric circuit. The following relationship holds: d1>d2.

As the relationship "d1>d2" holds, the portion of the connecting rod 12 where the hole 12*a* is formed is not rubbed against the sealers 15 when the vacuum circuit breaker 2 performs opening and closing operation. Therefore, the sealers 15 are free from a scratch resulting from being rubbed against the portion of the connecting rod 12 where the hole 12*a* is formed. As a result, the vacuum circuit breaker 2 can suppress deterioration of the sealers 15 that may be caused by the operation of the connecting rod 12.

According to the embodiment, the vacuum valve 1 includes not only the vacuum vessel 3, but also includes; the cylinder 8; the partition wall 9; the lid 10; the connecting rod 12; and the holder 16, which are some of the constituent elements of the vacuum circuit breaker 2. The holder 16 holds the connecting rod 12 in a state where the moving contact 5 is separated from the fixed contact 4. Since the vacuum valve 1 includes the holder 16, it is possible to suppress the moving contact 5 from coming into contact with the fixed contact 4, and to suppress deterioration of voltage resistance performance. The vacuum valve 1 can suppress axial misalignments among the elements inside the vacuum vessel 3, and suppress deterioration of voltage resistance performance. As described above, the vacuum valve 1 and the vacuum circuit breaker 2 have the effect of suppressing deterioration of voltage resistance performance.

The configuration set forth in the above embodiment is an example of the subject matter of the present disclosure. The configuration of the embodiment can be combined with another known technique. It is possible to make omissions and changes to part of the configuration of the embodiment without departing from the scope of the present disclosure.

REFERENCE SIGNS LIST

1 vacuum valve; 2 vacuum circuit breaker; 3 vacuum vessel; 4 fixed contact; 5 moving contact; 6 fixed conductor; 7 movable conductor; 8 cylinder; 9 partition wall; 10, 25, 27 lid; 11 bellows; 12 connecting rod; 12*a*, 17*b* hole; 13 insulating rod; 14 seal case; 15 sealer; 16 holder; 17 retainer; 17*a*, 17*c* end; 18 pin; 21 tank; 22 manipulator; 23, 24 branch pipe; 26 shield; 28 opening; 29 insulating support; 30, 31 outer conductor; 32 connector.

The invention claimed is:

1. A vacuum valve that can be incorporated into a vacuum circuit breaker, the vacuum valve comprising:
- a cylindrical vacuum vessel;
- a cylinder disposed coaxially with the vacuum vessel;
- a partition wall provided between an end of the vacuum vessel and an end of the cylinder, the partition wall separating an inside of the vacuum vessel from an inside of the cylinder;
- a movable conductor penetrating the partition wall, the movable conductor being movable in an axial direction in the vacuum vessel and the cylinder;
- a fixed contact fixed inside the vacuum vessel;

a moving contact integrated with the movable conductor, the moving contact being capable of separating from the fixed contact and coming into contact with the fixed contact in association with movement of the movable conductor;

a lid adapted to cover an end of the cylinder, the end being on a side opposite to the partition wall;

a connecting rod penetrating the lid and coupled to the movable conductor via an insulator; and a holder adapted to hold the connecting rod while preventing movement of the connecting rod toward the fixed contact in a state where the moving contact is separated from the fixed contact, wherein the holder is removable in a state where the connecting rod is connected to a manipulator that opens and closes the vacuum circuit breaker by causing the connecting rod to operate, wherein the holder includes:

a retainer detachably attached to the lid, the retainer holding a portion of the connecting rod, the portion protruding from the lid to an outside of the cylinder; and a fastener detachably attached to the connecting rod, the connecting rod is held in a state where a part of the connecting rod protrudes from an end of the retainer, the end being on a side opposite to the lid, and the fastener is attached to the part of the connecting rod protruding from the retainer, and prevents movement of the connecting rod by coming into contact with the retainer, wherein a distance between the fastener and an end of the retainer, the end being on a side on which the lid is located is longer than a distance between the fixed contact and the moving contact when the fastener is in contact with the retainer.

2. A method for manufacturing a vacuum circuit breaker, the vacuum circuit breaker including:

a cylindrical vacuum vessel;

a cylinder disposed coaxially with the vacuum vessel;

a movable conductor movable in an axial direction in the vacuum vessel and the cylinder;

a fixed contact fixed inside the vacuum vessel;

a moving contact integrated with the movable conductor, the moving contact being capable of separating from the fixed contact and coming into contact with the fixed contact in association with movement of the movable conductor;

a vacuum valve including a connecting rod coupled to the movable conductor via an insulator;

a tank; and a manipulator adapted to cause the connecting rod to operate, the method for manufacturing the vacuum circuit breaker comprising:

disposing the vacuum valve in the tank, where a holder is attached to the vacuum valve, wherein the holder includes a retainer detachably attached to the lid, the retainer holding a portion of the connecting rod, the portion protruding from the lid to an outside of the cylinder, and a fastener detachably attached to the connecting rod, and the holder is adapted to hold the connecting rod while separating the moving contact from the fixed contact and preventing movement of the connecting rod toward the fixed contact;

coupling the connecting rod to a connector of the manipulator; and removing the holder from the vacuum valve.

* * * * *